Jan. 24, 1928.
F. KOHLS ET AL
1,657,403
THRASHING MACHINE HOOD ATTACHMENT
Filed Jan. 12, 1927
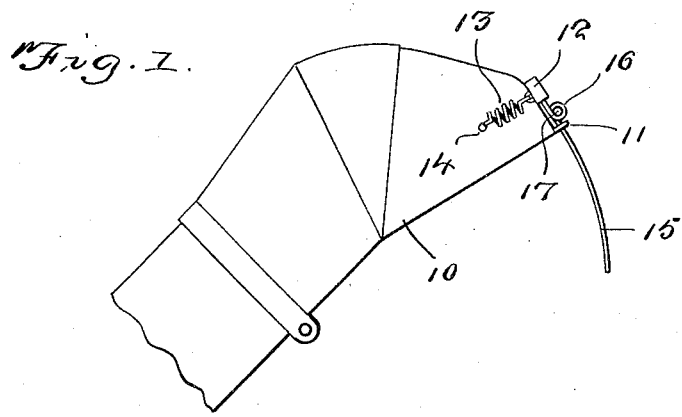
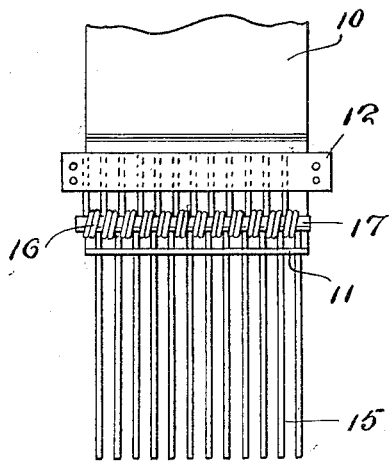
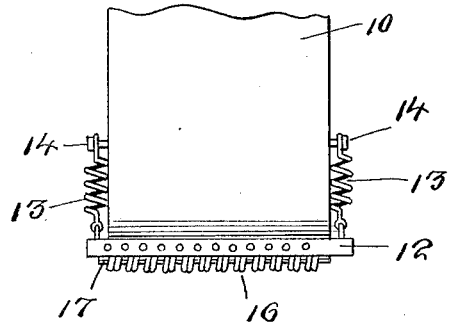
Anton Kohls
Frank Kohls
INVENTOR
BY Victor J. Evans
ATTORNEY
WITNESS:

Patented Jan. 24, 1928.

1,657,403

UNITED STATES PATENT OFFICE.

FRANK KOHLS AND ANTON KOHLS, OF CLERMONT, IOWA.

THRASHING-MACHINE HOOD ATTACHMENT.

Application filed January 12, 1927. Serial No. 160,690.

This invention relates to hood attachments for use upon thrashing machines to materially aid in the stacking of straw.

An object of the invention contemplates means disposed in the path of exit for the straw to deflect the same upon the apex of a straw stack.

A further object of the invention comprehends resilient means adapted for connection with the hood to provide a resilient support therefor.

With the above and other objects in view, the invention further includes the following novel features of construction to be hereinafter more fully described and pointed out in the appended claim.

In the drawings:

Figure 1 is a fragmentary elevation of a thrashing machine hood with the present invention applied.

Figure 2 is a front elevation of the invention.

Figure 3 is a fragmentary top plan view of the invention as applied.

Referring to the drawing in detail wherein like characters of reference denote corresponding parts, the reference character 10 indicates a conventional form of thrashing machine hood including an outstanding flange 11 upon the periphery thereof.

The invention consists of a bar member 12 carrying retractile springs 13 for connection with headed studs 14 carried upon the opposed sides of the hood 10. A multiplicity of curved tines 15 are adapted to provide spring convolutions 16 adjacent the upper ends thereof and having the upper extremities thereof extended within openings disposed transversely of the bar 12. Said tines are also passed through openings, not shown, in the flange 11 registering with the openings in the bar 12. A shaft 17 is passed within the convolutions 16 of each of the tines to prevent the latter from turning or becoming in any way distorted.

In the use and operation of a hood of the character described a great quantity of straw is blown over a contemplated stack. This is caused by the curvature of the hood and the inclination of the periphery thereof. The present invention is designed to overcome this difficulty by disposing the tines 15 in the path of exit of said blown over straw to deflect the same upon the apex of the aforementioned stack. When the straw is under great pressure and deflected against the tines 15 the same will give due to the configuration thereof and the specific construction thereof due to the spring convolution 16 formed at the aforementioned points in their respective lengths. The springs 13 serve to retain the bar 12 and tines 15 upon the hood and from which position the same may be readily removed in the instance of inserting the hood 10 within a barn window for stacking the straw therein, wherein the invention is of no effect.

The invention is susceptible of various changes in its forms, proportions and minor details of construction and the right is herein reserved to make such changes as properly fall within the scope of the appended claim.

Having thus described the invention, what we claim as new is:

A thrashing machine hood attachment comprising a bar, retractile springs carried by the bar for detachably securing the same upon the hood, the hood having an apertured flange disposed in parallelism with the bar, a multiplicity of curved tines passed through the flange and provided with a multiplicity of spring convolutions at appropriate points in their lengths and having the upper extremities thereof carried by the bar, the lower extremities of the tines being disposed in the path of exit of the hood discharge for deflecting and stacking the same, and a shaft passed through said convolutions to prevent distortion of the tines.

In testimony whereof we affix our signatures.

FRANK KOHLS.
ANTON KOHLS.